(12) United States Patent
Karni et al.

(10) Patent No.: US 6,516,794 B2
(45) Date of Patent: Feb. 11, 2003

(54) CENTRAL SOLAR RECEIVER

(75) Inventors: Jacob Karni, Rehovot (IL); Pinchas Doron, Rishon le Tsion (IL); Moshe Danino, Jerusalem (IL)

(73) Assignees: Yeda Research and Development Co., Ltd., Rehovot (IL); E.D.I.G. Industries and Assemblies Ltd., Tel Aviv (IL); Rotem Industries Ltd., Beer-Sheva (IL)

( * ) Notice: Subject to any disclaimer, the term of this patent is extended or adjusted under 35 U.S.C. 154(b) by 0 days.

(21) Appl. No.: 09/749,591

(22) Filed: Dec. 28, 2000

(65) Prior Publication Data

US 2002/0083946 A1 Jul. 4, 2002

(51) Int. Cl.[7] .................................................. F24J 2/07
(52) U.S. Cl. ........................ 126/682; 126/680; 126/705
(58) Field of Search ................................ 126/648, 682, 126/704, 705, 706, 680, 652

(56) References Cited

U.S. PATENT DOCUMENTS

| 4,018,212 A | | 4/1977 | Hein et al. |
| 4,043,318 A | * | 8/1977 | Pei .............................. 126/652 |
| 4,088,120 A | | 5/1978 | Anderson |
| 4,491,681 A | | 1/1985 | Kirpich |
| 4,602,614 A | | 7/1986 | Percival et al. |
| 5,323,764 A | | 6/1994 | Karni et al. |
| 5,421,322 A | | 6/1995 | Karni et al. |
| 5,437,265 A | * | 8/1995 | Yamauchi et al. .......... 126/680 |
| 5,931,158 A | | 8/1999 | Buck |

FOREIGN PATENT DOCUMENTS

| DE | 197 44 541 | 4/1999 |
| IL | 97091 | 11/1994 |

* cited by examiner

Primary Examiner—Sara Clarke
(74) Attorney, Agent, or Firm—Browdy and Neimark, P.L.L.C.

(57) ABSTRACT

A central solar receiver comprises an axisymmetric housing having front and rear ends and having an aperture at the front end, an elongated tubular window mounted in the aperture co-axially with the housing, a volumetric solar absorber disposed within the housing and extending around and along the elongated window for absorbing solar radiation that has passed therethrough; and working fluid ingress and egress formed in the housing so as to, respectively, inject thereto, and withdraw therefrom, a pressurized working fluid in a manner enabling the working fluid interaction with the volumetric absorber. The window has an open front end which is secured to the housing at the front end thereof, and a closed rear end which is disposed adjacent the rear end of the housing and is free of any securing thereto.

19 Claims, 3 Drawing Sheets

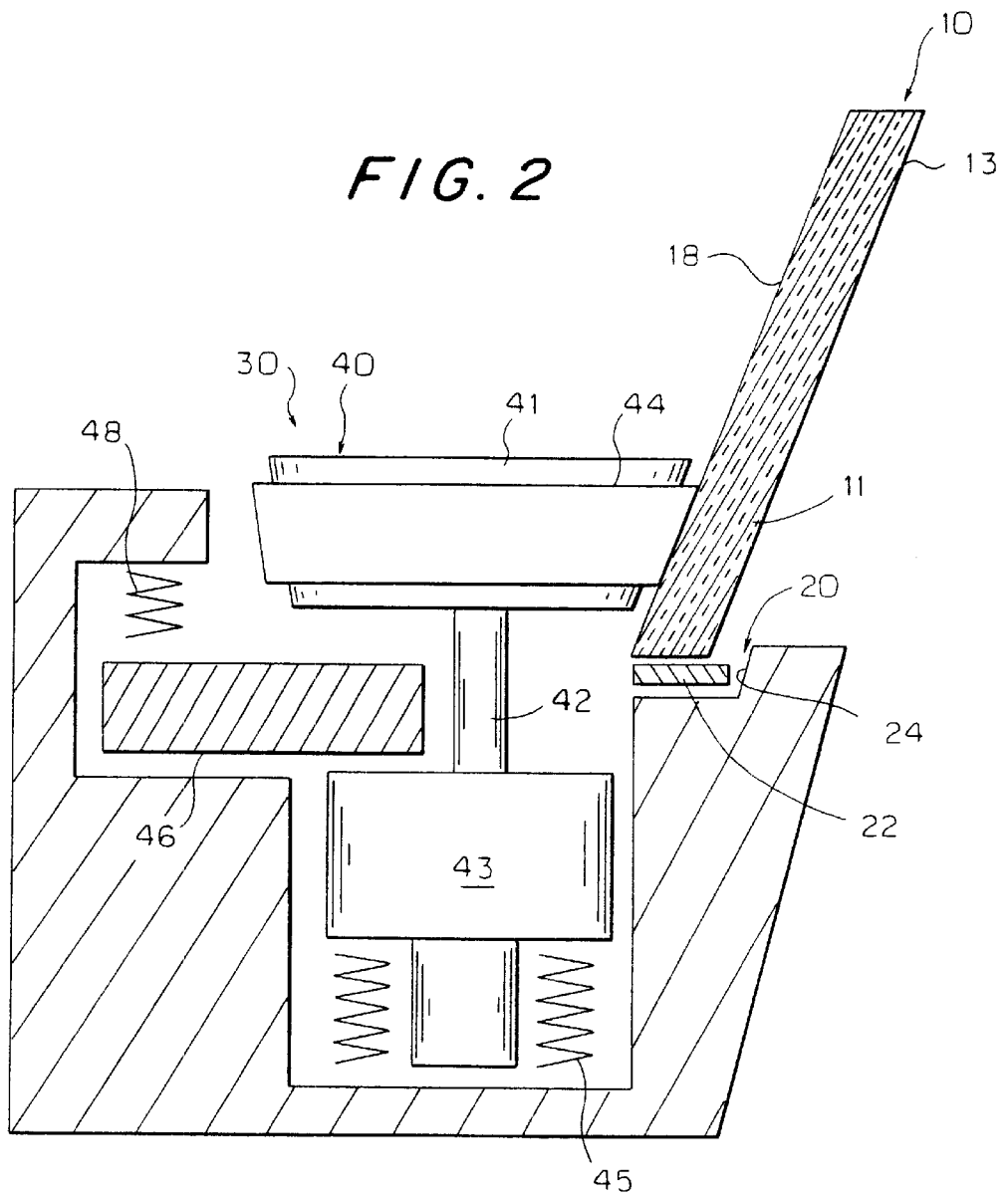

CENTRAL SOLAR RECEIVER

FIELD OF THE INVENTION

This invention relates to a central solar receiver, and, particularly, to a window for use in such a receiver for admitting and passing thereto concentrated solar radiation.

BACKGROUND OF THE INVENTION

The present invention is particularly directed to a central solar receiver which comprises a housing with a solar absorber adapted to absorb concentrated solar radiation at high temperatures, commonly—above 500° C., and a working fluid circulating therein in indirect or direct heat exchange relationship with the solar absorber. The housing of such a solar receiver is formed with an aperture located in the focal region of a solar radiation concentration system, and holding a window adapted to admit highly concentrated solar radiation from the concentration system and to pass it towards the solar absorber.

The solar absorber used in central solar receivers of the above kind is often a volumetric solar absorber that is fabricated in the form of a three-dimensional matrix enabling the working fluid to flow therethrough, thereby transferring the heat to the working fluid. Such solar receivers are described, for example, in IL 97091 and U.S. Pat. No. 5,323,764.

The working fluid used in central solar absorbers normally either serves as heat carrier fluid or else is designed to perform a heat induced, possibly catalyzed, endothermic chemical reaction between components of the working fluid.

For various industrial applications such as the operation of gas turbines for electricity generation or the performance of endothermic reactions of the kind specified, it is necessary to enable the working fluid to circulate through the system at an elevated pressure of at least about 2 atmospheres. At such a pressure, the density of the circulating gaseous working fluid is higher than it would have been if it were in the non-pressurized state and, consequently, pressure losses during circulation are lower.

One of the most critical problems associated with a pressurized central solar receiver having a window, is the mechanical strength of the window. Materials that have required optical and thermal properties, tend to be brittle, which means that while they can withstand large compression stresses, they tend to crack or shatter under even relatively small tension stresses. Stresses in the window are created by the gas pressure in the interior of the receiver and also by uneven thermal expansion of the window and other receiver components that are in contact therewith, as they heat up during operation.

U.S. Pat. No. 5,323,764 and U.S. Pat. No. 5,421,322 disclose a central solar receiver with a window having a frusto-conical shape having a front large-diameter and rear small-diameter open ends both formed with cylindrical front and rear rims at which the window is secured to the housing at its front and rear ends. The front end of the housing is formed with an annular positioning groove and the front rim of the window is received therewithin and secured there by means of an O-ring. The rear rim of the window is secured within a metal block which inter alia includes thermal expansion absorbing bellows and a reflector adapted to protect the block and also the bellows from concentrated solar radiation entering the window.

It is an object of the present invention to provide a new window for use in a central solar receiver and a new central solar receiver using the same.

SUMMARY OF THE INVENTION

According to one aspect of the present invention, there is provided a central solar receiver comprising:

an axisymmetric housing having front and rear ends and having an aperture at the front end;

an elongated tubular window mounted in said aperture co-axially with the housing, the window having an open front end which is secured to the said housing at the front end thereof, and a closed rear end which is disposed adjacent the rear end of the housing and is free of any securing thereto, the window having a first surface facing incident concentrated solar radiation and a second surface facing the interior of the housing;

a volumetric solar absorber disposed within said housing and extending around and along said elongated window for absorbing solar radiation that has passed therethrough; and working fluid ingress and egress formed in said housing so as to, respectively, inject thereto, and withdraw therefrom, a pressurized working fluid in a manner enabling the working fluid interaction with said volumetric absorber.

In accordance with another aspect of the present invention, there is provided a window for use in a central solar receiver of the above kind, for admitting and passing into the receiver incident highly concentrated solar radiation, the window having an elongated tubular shape with an open front end adapted for being secured in said aperture of the receiver, and a closed rear end free of any securing means.

The design of the window of the present invention and the manner of its mounting in the central solar receiver, whereby the window is secured only at its front end, simplify the receiver's design and prevent the window from having undue constraints, which renders it suitable for use at high temperatures and elevated pressures.

The window is preferably of a frusto-conical shape, with its open front end being a large diameter end and its closed rear end being a small diameter end. However, the window may have any other elongated axisymmetric shape, e.g. a cylindrical shape, in which case its front end may be formed with a rim having a diameter greater than that of the remainder of the window.

Preferably, the window's front end is secured to the housing by elastic mounting devices such as, e.g. spring-loaded clamps, that permanently exert on the window's body axial force that keeps the window in place and prevents its motion under forces acting thereon during thermal and pressure cycles when the receiver is operated.

Preferably, the rear closed small-diameter end of the window is in the form of a cap-like concave surface continuously merging with the window's conical surface. This shape of the closed end, and the frusto-conical shape of the window's body, ensure that any pressure exerted on the window from within the housing produces force components acting perpendicular and along the window's surface, which only results in compression stresses rather than tension stresses that may cause the window to crack.

Preferably, the working fluid ingress is located adjacent the rear end of the housing co-axially therewith so as to face said closed end of the window. It is still more preferable that an additional solar absorber is mounted in the housing between the working fluid ingress and the closed end of the window so as to absorb concentrated solar radiation that has passed through the closed end. Thereby, the working fluid ingress is protected from direct penetration thereto of concentrated solar radiation and is pre-heated, while entering the receiver, before its interaction with said volumetric solar absorber. The additional solar absorber may also be a volumetric solar absorber.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 2 is an enlarged view of the area A of the receiver shown in FIG. 1; and

DETAILED DESCRIPTION OF THE INVENTION

Figure 1:
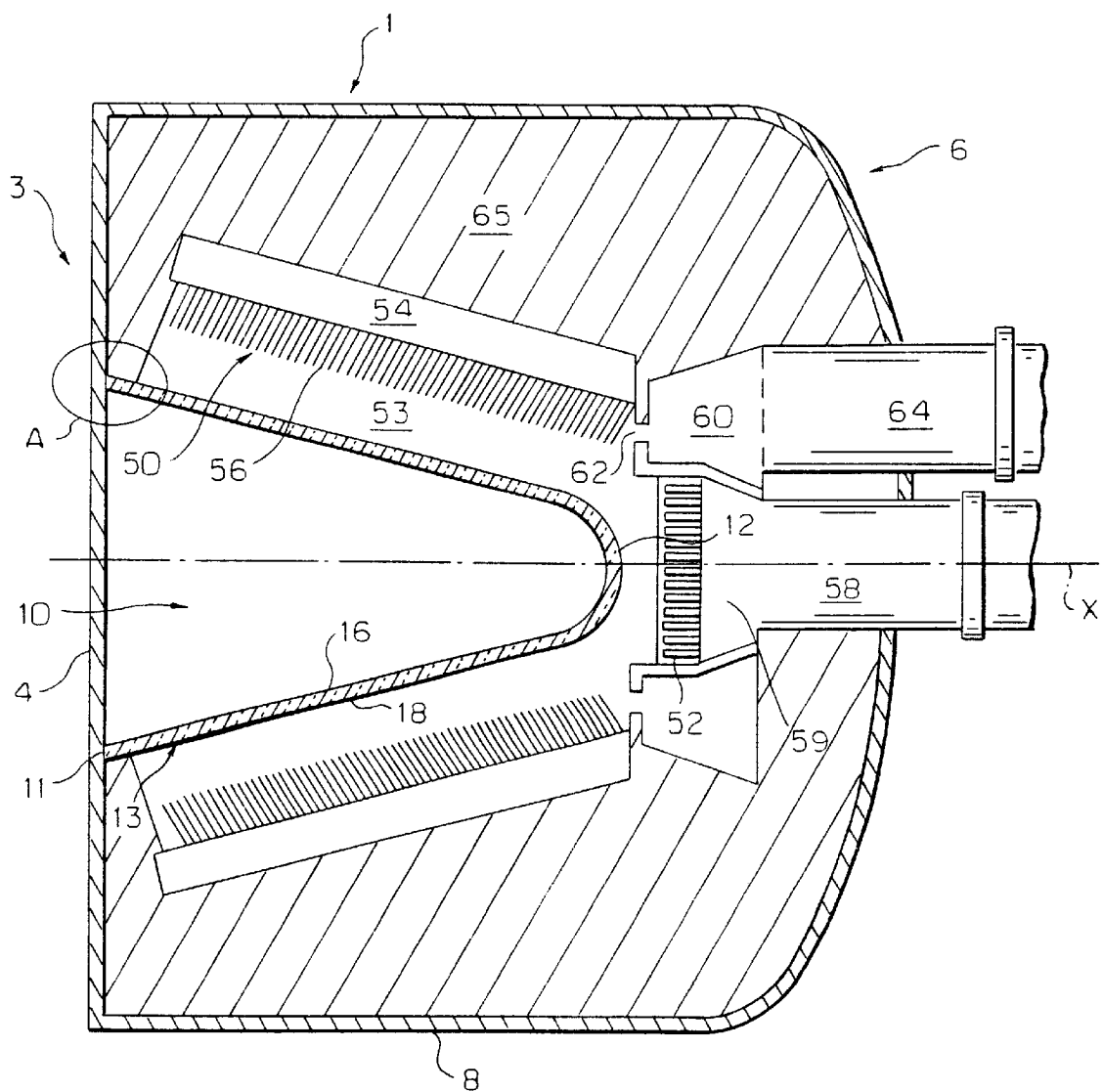
FIG. 1 is a cross-sectional schematic view of a central solar receiver according to the present invention.

A central solar receiver of the present invention, shown in FIG. 1, is designed to be associated with a solar radiation concentration system (not shown), and it comprises a metal housing 1 having a longitudinal axis X, a front end 3 with an aperture 4 therein facing concentrated solar radiation, a rear end 6 and outer side walls 8. The receiver further comprises an elongated tubular window 10 mounted in the aperture 4 co-axially with the housing 1, the window being adapted for the admission of highly concentrated solar radiation from the solar radiation concentration system, and being capable of withstanding high temperatures. For this purpose, the window may be made of any conventional material having desired optical and thermal properties such as, for example, fused quartz.

Figure 3A:
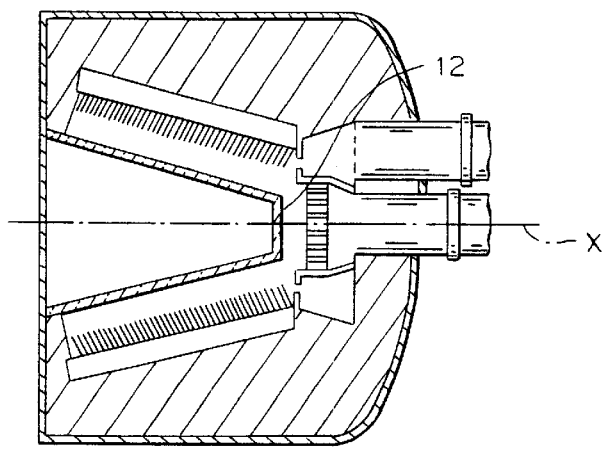
FIGS. 3A, 3B and 3C are alternative designs of the central solar receiver shown in FIG. 1.
Figure 3B:
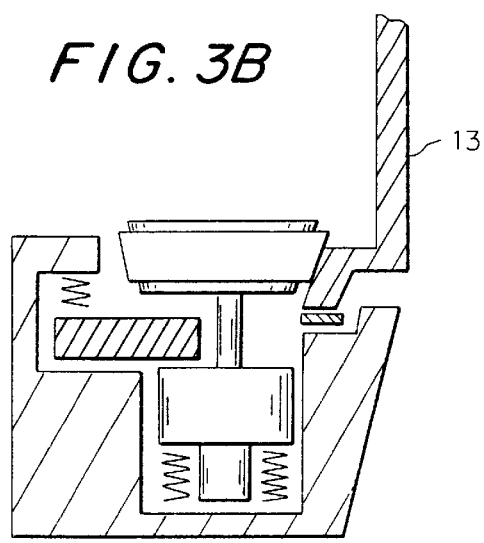
Figure 3C:
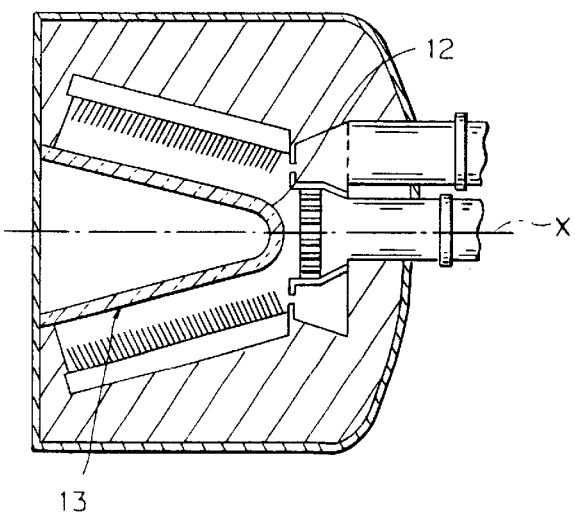

The window 10 has an open front large-diameter end 11, a rear closed small-diameter end 12 and a frusto-conical elongated window body 13 axially extending therebetween, with a first surface 16 facing incident concentrated solar radiation and a second surface 18 facing the interior of the housing 1. The window body 13 has a circular cross-sectional shape but this shape may be of any other desired type. Also, the window body may be cylindrical, with the front large-diameter end being in the form of a rim, as shown in FIG. 3B. If desired, the window 10 may be of a double-pane type with a gap between inner and outer panes, as shown in FIG. 3C.

The window 10 is held in the housing 1 solely by means of its large-diameter end 11 being secured in the aperture 4 at the front end 3 of the housing 1, as schematically shown in more detail in FIG. 2. The front end 3 of the housing is formed with an annular groove 20 having a groove bottom with an annular seal 22 and a groove side wall 24. The large diameter end 11 of the window is secured in the annular groove 20 by means of a plurality of adjustable spring-loaded mounting devices 30 (one of which is shown in FIG. 2), located along the circumference of the aperture 4 of the housing. Each mounting device 30 comprises a mushroom-like clamp 40 having an eccentric head 41 and a leg 42 with a skirt 43. The head 41 of the clamp 40 has a conical circumference to suit the profile of the frusto-conical body 13 of the window 10, and it is lined by a soft ceramic rope 44 adapted to contact the window without damaging it. The skirt 43 of the clamp 40 is held between a circular first spring 45 and a flange 46 pressed by a second spring 48. Setting of the clamp 40 is accomplished by turning it around its axis until the rope 44 of the eccentric head 41 abuts the second surface 18 of the window's body 13, exerting thereby a proper pressure on the window 10, and the springs 45 and 48 are designed so as to keep this pressure permanent. Due to the conical shape of the window's body 13, this pressure produces an axial force pushing the window towards the seal 22 at the bottom of the annular groove 20 to keep the window in place and prevent its motion under forces acting thereon during thermal and pressure cycles when the receiver is operated.

The rear closed small-diameter end 12 of the window 10 is in the form of a cap-like surface smoothly merging with the frusto-conical body 13 of the window. Since the small-diameter end 12 is free of any securing means, its cap-like surface may have any desired shape, e.g. it may be concave, spherical or non-spherical, or rather it may even be flat, as shown in FIG. 3A.

The receiver further comprises a first, tubular volumetric absorber 50 extending around and facing the frusto-conical body 13 of the window 10, and a second, disc-shaped volumetric through-flow type solar absorber 52, disposed at the rear of the housing 1 and facing the closed end 12 of the window 10. The absorbers 50 and 52 define with the second surface 18 of the window 10 a receiver chamber 53.

The first volumetric absorber 50 has a frusto-conical base 54 with an array of spike-like absorber members 56 spaced from each other and projecting from one face of the base 54 towards the window 10. However, the absorber 50 may be of any other suitable design. For example, it may not be frusto-conical but rather may have polyhedral-prismatic, cylindrical, paraboidal, ellipsoidal, or the like shape. The spike-like configuration of the absorber members 56 is not critical and any other suitable configuration may also be used such as, for example rods, hollow cylindrical tubes, frustum, flat panels and the like.

The second volumetric absorber 52 may have a design similar to that as described above with respect to the absorber 50, with a difference that a base body of the absorber 52 should be perforated or designed otherwise to pass therethrough a working fluid. It may also be of any other suitable type such as, for example, a honeycomb type, grid type, wire-mesh type, foam type etc. The parallel disc shape of volumetric solar absorber 52 is not critical and any other suitable shape may also be used. For example, the absorber 52 may be dome shaped, may have the form of a disc with non-parallel faces, disc with bores and the like.

Each absorber 50, 52 is made of any suitable heat-resisting material such as a ceramic material, a ceramic-coated metal alloy, silicone carbine, alumina, a special type stainless-steel, a nickel alloy or the like.

The receiver further comprises a working fluid ingress duct 58 located at the rear end 6 of the housing co-axially therewith, for the ingress of working fluid into the receiver chamber 53. The duct 58 has an ingress funnel 59 of a transverse dimension greater than that of the closed end 12 of the window. The second volumetric absorber 52 described above is preferably mounted in the funnel 59, whereby it is ensured that the duct 58 is protected from concentrated solar radiation penetrating the window at its closed end 12 and that all working fluid is pre-heated to a certain extent by the small absorber 52 before being injected in the receiver chamber 53.

The receiver further comprises a working fluid annular egress chamber 60 surrounding the ingress funnel 59, with an annular egress orifice 62 located to the back of the large volumetric solar absorber 50, and a tubular egress vent 64, for the withdrawal of working fluid from the receiver chamber 53.

The working fluid used in the central solar receiver of the present invention is preferably, a gas such as air, that is adapted to circulate in the receiver chamber 53 at high temperatures (about 500° C. and higher) and at elevated pressures of at least about 2 atmospheres. The working gas may be of any kind suitable to serving as heat carrier for removal of heat generated in the solar absorber. In addition or alternatively it may consist of a mixture of two or more components which, upon contact with the hot solar absorber, are induced to react with each other, i.e. to perform a thermo-chemical process. In the latter case, the projecting members 56 of the volumetric absorber 50 may be coated with a suitable catalyst.

It should be noted that the geometry of the ingress and egress of the pressurized working fluid does not need to be as described above but rather may be modified to meet specific design requirements.

The housing 1 further comprises an insulating material 65 which fills all its volume between the housing outer walls 8 and the base 54 of the first volumetric absorber 50, and which also surrounds the ingress duct 58, the egress vent 64 and the annular egress chamber 60.

In operation, concentrated solar radiation is admitted via the large diameter end 11 of the window 10. Most of the radiation penetrates through the frusto-conical body 13 of the window and impinges on the absorber members 56 of the first volumetric solar absorber 50. The incident solar radiation that does not penetrate the window body 13 penetrates through the window's closed rear end 12 and impinges the second volumetric solar absorber 52. The solar absorbers 50 and 52 are thereby heated up.

Pressurized working fluid is injected into the receiver via the ingress duct 58 and its ingress funnel 59, wherein it flows through the second volumetric absorber 52 and is thereby heated up to some extent prior to its entering the receiver chamber 53. After having passed through the second absorber 52, the working fluid flows towards and along the window's closed end 12 and further along the frusto-conical body 13 of the window 10, whereby the window is cooled all along its surface. The same effect may be obtained with a window having a double-pane design as mentioned above, where the working fluid will flow along the gap between the panes, subject to the provision of appropriate fluid passages in the window's inner pane at the front and rear ends of the window.

After having approached the area of the receiver chamber 53 adjacent the front end 3 of the housing, the working fluid is turned back and flows through the volumetric absorber 50 intersecting the array of its members 56, where it is heated up and/or becomes involved in an endothermic chemical reaction. The hot working fluid and/or the reaction product further enters the annular egress chamber 60 via the egress orifices 62 and is discharged via the egress vent 64, e.g. for operating electric power generating turbines.

In the course of operation, any motion of the window 10 relative to the receiver housing is compensated by the spring-loaded mounting devices 30. Any thermal expansion of any receiver components, whether symmetric or asymmetric, is not transmitted to the window 10 due to its being set at the large diameter end 11 only.

It should be understood that the above-described embodiment is only one example of a central solar receiver and a window used therein according to the present invention, and that the scope of the present invention as defined in the claims fully encompasses other embodiments which may become obvious to those skilled in the art.

We claim:

1. A central solar receiver comprising:
   a housing having a longitudinal axis of symmetry and front and rear ends spaced therealong, and having an aperture at the front end;
   a tubular window mounted in said aperture co-axially with the housing, the window having an open front end which is secured to said housing at the front end of the housing, a closed rear end which is disposed adjacent the rear end of the housing and is free of any securing thereto, and an elongated window body extending along said axis between the front and rear ends of the window, the window having a first surface facing incident concentrated solar radiation and a second surface facing the interior of the housing;
   a volumetric solar absorber disposed within said housing and extending around and along said window for absorbing solar radiation that has passed therethrough; and
   a working fluid ingress and a working fluid egress formed in said housing so as to, respectively, inject thereto, and withdraw therefrom, a pressurized working fluid in a manner enabling the working fluid interaction with said volumetric absorber, wherein said working fluid ingress is located adjacent the rear end of the housing co-axially therewith and faces said closed end of the window.

2. The central solar receiver according to claim 1, wherein the front end of the window is secured to the housing by elastic mounting devices located around the aperture in said housing.

3. The central solar receiver according to claim 2, wherein said mounting devices are spring-loaded clamps.

4. The central solar receiver according to claim 1, wherein said rear closed end of the window has a concavely curved shape continuously merging with said window body.

5. The central solar receiver according to claim 1, wherein said rear closed end of the window is flat.

6. The central solar receiver according to claim 1, further comprising an additional solar absorber mounted in the housing between the working fluid ingress and the closed end of the window.

7. The central solar receiver according to claim 6, wherein said absorber has a transverse dimension greater than that of the closed end of the window, so as to absorb concentrated solar radiation that has passed through said closed end.

8. The central solar receiver according to claim 7, wherein said additional volumetric absorber has passages capable of passing therethrough the working fluid flowing from said ingress.

9. The central solar receiver according to claim 8, where said ingress is in the form of a duct having a front funnel and said additional volumetric absorber is mounted in said funnel.

10. The central solar receiver according to claim 9, wherein said additional volumetric absorber is generally disc-shaped.

11. The central solar receiver according to claim 1, wherein said window has a frusto-conical body.

12. The central solar receiver according to claim 1, wherein said window has a cylindrical body in which said front end is in the form of a rim having a diameter greater than that of the cylindrical body.

13. The central solar receiver according to claim 1, wherein said window is of a double-pane type.

14. For use in a central solar receiver having an aperture at its front end, a window for mounting in said aperture and for admitting and passing into the receiver incident concentrated solar radiation, the window having a longitudinal axis and having a tubular shape with an open front end adapted for being secured in said aperture of the receiver, a closed rear end free of any securing means, and an elongated body window extending along said axis, said window body having either a frusto-conical shape or a cylindrical shape in which said front end is in the form of a rim having a diameter greater than that of the cylindrical body.

15. The window according to claim 14, wherein said window is of a double-pane type.

16. The window according to claim 14, wherein said rear closed end of the window has a concavely curved shape continuously merging with said window body.

17. The window according to claim 14, wherein said rear closed end of the window is flat.

18. A central solar receiver comprising:

an axisymmetric housing having front and rear ends and an aperture at the front end;

a tubular window mounted in said aperture co-axially with the housing, the window having an open front end which is secured to said housing by the elastic mounting devices located around the aperture of the housing and a closed rear end which is disposed adjacent the rear end of the housing and is free of any securing thereto, the window having a first surface facing incident concentrated solar radiation and a second surface facing the interior of the housing;

a volumetric solar absorber disposed within said housing and extending around and along said window for absorbing solar radiation that has passed therethrough; and a working fluid ingress and a working fluid egress formed in said housing so as to, respectively, inject thereto, and withdraw therefrom, a pressurized working fluid in a manner enabling the working fluid interaction with said volumetric absorber.

19. A central solar receiver comprising:

an axisymmetric housing having front and rear ends and an aperture at the front end;

a tubular window mounted in said aperture co-axially with the housing, the window having an open front end which is secured to said housing at the front end of the housing, a closed rear end which is disposed adjacent the rear end of the housing and is free of any securing thereto, and as window body having wither a frusto-conical shape or a cylindrical shape in which said front end is in the form of a rim having a diameter greater than that of the cylindrical body; the window having a first surface facing the interior of the housing;

a volumetric solar absorber disposed within said housing and extending around and along said window for absorbing solar radiation that has passed therethrough; and a working fluid ingress and a working fluid egress formed in said housing so as to, respectively, inject thereto, and withdraw therefrom, a pressurized working fluid in a manner enabling the working fluid interaction with said volumetric absorber.

* * * * *